United States Patent
Murase

[15] 3,674,109
[45] July 4, 1972

[54] THERMO-PLASTIC LAMINATED STRUCTURE

[72] Inventor: Yoshihiko Murase, Hamamatsu, Japan
[73] Assignee: Nippon Gakki Seizo Kabushiki Kaisha, Hamamatsu-shi, Japan
[22] Filed: Aug. 19, 1970
[21] Appl. No.: 65,204

[30] Foreign Application Priority Data

Aug. 27, 1969 Japan.................................44/67154
Aug. 26, 1969 Japan.................................44/66910
Aug. 26, 1969 Japan.................................44/66911

[52] U.S. Cl. ..........................181/32 R, 156/87, 156/253, 156/285, 156/286, 161/113, 161/125, 161/159, 161/160
[51] Int. Cl...................B32b 1/00, B32b 3/10, G10k 13/00
[58] Field of Search..................161/112, 113, 125; 156/87, 156/253, 285, 286; 181/31 R, 31 B, 32 R, 63

[56] References Cited

UNITED STATES PATENTS

| 284,936 | 9/1883 | Williams | 156/87 |
|---|---|---|---|
| 1,957,732 | 5/1934 | Rowe | 156/87 |
| 2,361,652 | 10/1944 | Radabaugh et al. | 161/112 X |
| 2,605,204 | 7/1952 | Benedict et al. | 161/113 X |
| 2,679,078 | 5/1954 | Clark | 161/112 X |
| 2,806,812 | 9/1957 | Merz | 161/113 X |
| 2,850,423 | 9/1958 | Kramp et al. | 161/113 X |
| 2,905,260 | 9/1959 | Williams | 181/32 |
| 2,978,376 | 4/1961 | Hulse | 161/113 X |
| 3,229,785 | 1/1966 | Pottash | 161/113 X |
| 3,285,364 | 11/1966 | Cohen | 181/32 X |
| 3,396,062 | 8/1968 | White | 264/321 |

FOREIGN PATENTS OR APPLICATIONS

| 362,521 | 7/1962 | Switzerland | 156/87 |

*Primary Examiner*—Robert F. Burnett
*Assistant Examiner*—Joseph C. Gil
*Attorney*—Lerner, David & Littenberg

[57] ABSTRACT

A thermo-plastic laminated structure, a production method, and an application thereof characterized in that a plurality of thermo-plastic sheets, inclusive of a foamed plastic sheet, are bonded together employing solvent evaporation type adhesive into a laminated structure which is thereafter provided with a plurality of minute holes bored mechanically in the direction of the thickness of the structure under the following limitations:

1. The holes thus bored reach the adhesive layer interposed between the component plastic sheets, whereby one or both sides of said adhesive layer are communicated with the outside atmosphere through said plurality of holes; and
2. The holes, however, do not penetrate the thermoplastic structure totally, whereby both sides of the thermoplastic structure are not communicated each other through these plurality of holes.

The structure is thereafter subjected to a curing process and vacuum formed into for instance a vibration plate of a loudspeaker.

1 Claim, 8 Drawing Figures

3,674,109

THERMO-PLASTIC LAMINATED STRUCTURE

BACKGROUND OF THE INVENTION

This invention relates to thermo-plastic laminated structures wherein two or more of thermo-plastic sheets are laminated together employing a solvent evaporation type adhesive (bonding agent). The invention furthermore relates to a production method of the above mentioned structures and their application.

Heretofore, when it is desired to produce a multi-layer structure of thermo-plastic sheets inclusive of a foamed plastic sheet of for instance polystyrene, the component layers of the above described structure have been bonded together employing adhesive of solvent type. However, since the conventional construction of the thermo-plastic sheets has afforded scarcely any gas permeability and also the foamed plastic sheet has possessed a comparatively heavy thickness having separately dispersed foams (closed cellules) therein, evaporation of the solvent of the adhesive has taken a long period of time and the production efficiency thereof has been reduced. Furthermore, there has been a much possibility of the solvent vapor or air being seized between the bonded layers to create bubbles therein thus causing swellings or wrinkles on the surface of the laminated structure while the laminated sheets undergo subsequent processes such as hot press and vacuum forming. This causes an occurrence rate of water products at a high level elevating the production cost for each products.

SUMMARY OF THE INVENTION

Therefore, a primary object of this invention is to eliminate the above mentioned shortcomings of the conventional laminated structure of plastic sheets.

Another object of the present invention is to provide an improved construction of the laminated structure wherein remaining solvent gas or vapor of the bonding agent or air between the laminated sheets, and hence the possibility of causing swellings or wrinkles on the surface of the laminated structure, is completely eliminated.

Still another object of the invention is to provide an improved construction of the laminated structure consisting of thermo-plastic component sheets bonded together by means of a bonding agent of solvent type, wherein the bonding layer is communicated with the outside atmosphere through one or both sides thereof, so that the vapor or gas of the solvent or air does not stay in the bonding layer but is quickly dispersed into the atmosphere, whereby the lamination treatment and shaping process following thereafter are much facilitated.

Still another object of the invention is to provide an improved construction of the laminated structure consisting of thermo-plastic component sheets bonded together employing a bonding agent, wherein the bonding layer is communicated to the outside atmosphere through a plenty of holes bored through one or both sides component sheets, so that any gas or air staying in the bonding layer is quickly dispersed into the atmosphere, whereby the creation of swellings or wrinkles on the surface of the laminated structure is substantially eliminated.

A further object of the invention is to provide an improved construction of the thermo-plastic laminated structure having a plenty of holes on one or both side surfaces thereof, but yet maintaining a gas impermeable nature through the inhole thickness of the laminated structure, whereby the structure may be thereafter formed through a vacuum forming process.

A still further object of the invention is to provide an improved method for producing the thermo-plastic structure of the above described construction.

An additional object of the invention is to provide an application of the thermo-plastic structure of the above described construction.

These and other objects of the invention can be achieved by an improved construction of a thermo-plastic structure which comprises two or more sheets of thermo-plastic material, inclusive of a foamed plastic sheet bonded together by adhesive (bonding agent) into a laminated structure, one or both sides of said structure having a plurality of minute holes bored under the following limitations:

1. The holes reach the bonding agent layer interposed between the component plastic sheets, whereby one or both sides of said bonding agent layer are communicated with the outside atmosphere in the direction of the thickness (i.e., direction perpendicular to the plane) of the thermo-plastic structure; and yet, 2. the holes do not penetrate the thermo-plastic structure completely in the direction of the thickness of the structure, whereby both sides of the thermo-plastic structure are not placed under a directly communicated condition.

According to another aspect of the invention, there is provided an improved method for producing the thermo-plastic structure of the above described construction, which comprises the manufacturing steps of applying a bonding agent on the bonding surfaces of thermo-plastic sheets inclusive of a foamed plastic sheet, laminating a plurality of such sheets into a multi-layer construction, boring a plurality of holes on one or both side surfaces of the thus laminated construction under following limitations:

1. The holes reach the bonding agent layer interposed between the component plastic sheets, whereby one or both sides of said bonding agent layer are communicated with the outside atmosphere in the direction of the thickness of the thermo-plastic structure; and yet, 2. The holes do not penetrate the thermo-plastic structure completely in the direction of the thickness of the structure, whereby both sides of the thermo-plastic structure are not placed under a directly communicated condition, and curing the bonding agent layer after the plurality of holes are bored mechanically in the direction of the thickness of the laminated structure.

According to still another aspect of the present invention, there is provided an improved vibration plate for a loud-speaker constituting an application of the thermo-plastic structure according to the first aspect of the invention, wherein a thermo-plastic sheet is bonded on the surface of a foamed sheet of a synthetic resin through an interposed bonding agent layer and a flat portion is integrally formed around the cone of the speaker, characterized in that a plenty of minute holes are provided on said flat portion of the speaker in a manner that the minute holes are spaced apart each other by a predetermined distance and bored from the upper surface of the thermo-plastic sheet to reach the bonding agent layer.

The invention will be better understood from the following description when read in conjunction with the accompanying drawings wherein like parts are designated by like reference numerals and characters.

DETAILED DESCRIPTION OF THE INVENTION

Figure 1:
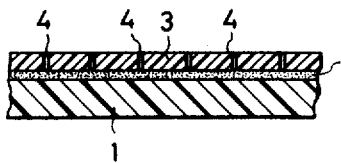
FIG. 1 is a cross-sectional view, in a much enlarged scale, of an example of the thermo-plastic laminated structure according to the present invention.

Referring to FIG. 1 showing an example of the thermo-plastic laminated structure according to the present invention, it is clearly indicated that the laminated structure comprises a basic sheet 1 consisting of, for instance, polystyrene paper (foamed polystyrene sheet) and a polyvinyl chloride resin sheet 3 overlying the basic sheet 1 through an intermediately disposed layer 2 of solvent evaporation type adhesive including organic solvent type; aqueous solution type and emulsion type, for instance, vinyl acetate family. In the overlying layer 3 made of a polyvinyl chloride resin, a number of minute holes 4, 4, 4, . . are bored at positions regularly arranged thereon and in a direction along the thickness (i.e., perpendicular to the plane) of the laminated structure so that the holes reach the intermediate layer 2 consisting of the above mentioned vinyl acetate type adhesive.

Because of the existence of the minute holes, the drying and curing steps of the adhesive (bonding agent) layer are accelerated. That is, the solvent (i.e., organic solvent and water) of the bonding agent is evaporated through these holes into the outside atmosphere, and the creation of bubbles or a part of air seized therein during the laminating step of the basic sheet and the overlying sheet is thereby prevented. As a result, the possibility of forming swelled portions or wrinkles on the surface of the laminated structure during the subsequent curing and forming steps (generally applying heat) of the structure is completely eliminated.

Figure 2:
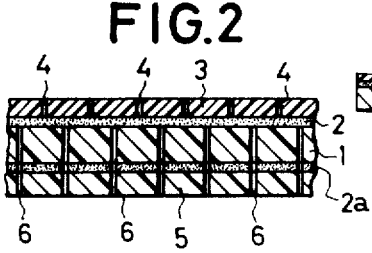
FIG. 2 is a cross-sectional view, in a much enlarged scale, of a second example of the thermo-plastic laminated structure according to the invention.

Referring to FIG. 2 showing another example of the thermo-plastic laminated structure according to the invention, there is indicated that the example of the structure comprises a basic sheet made of polystyrene paper 1, a polyvinyl chloride sheet 3 overlying the upper surface of the basic sheet 1, and an ABS (acrylonitrile-butadiene-styrene) resin sheet 5 underlying the basic sheet 1. These three sheets are bonded together into a three layer structure through bonding agent layers 2 and 2a consisting of a bonding agent of, for instance, vinyl acetate type. Accordingly to the characteristic feature of this invention, the upper sheet 3 is bored with a plurality of minute holes 4, 4, 4, . . . . and the lower sheet 5 and the basic sheet 1 inclusive of the bonding layer 2a are bored with a plurality of minute holes 6, 6, 6, . . . so that the both kinds of the minute holes reach the upper and lower surfaces of the bonding agent layer 2, respectively. At this point, it should be noted that the minute holes 4, 4, 4, . . . and another set of minute holes 6, 6, 6, . . . are bored at positions staggered or offset between each other, so that there is no possibility of anyone of the upper holes 4, 4, . . . communicates with anyone of the lower holes 6, 6, 6, . . . (in this case, the bonding agent layer 2 is acting as a barrier between the two sets of holes).

With the above described construction of the thermo-plastic laminated structure, the bonding agent layer 2 is evaporated and cured, through the minute holes 4, 4, 4, . . . and the bonding agent layer 2a is evaporated and cured through the minute holes 6, 6, 6, . . . The bonding agent layer 2 is furthermore partly dried out through the minute holes 6, 6, 6, . . . , whereby the evaporation and the curing of these bonding layers 2 and 2a are accelerated.

It will be apparent that the provision of the minute holes may be carried out mechanically along the direction of the thickness of the laminated structure, and through these holes any air or gas seized between the laminated sheets during the bonding step can be dispersed into the outside atmosphere.

For both of the above described reasons, the required time period in the drying and curing step of the laminated structure can be substantially shortened, and swellings or wrinkles caused in the subsequent steps may also be eliminated. Furthermore, since the holes do not penetrate the complete thickness of the laminated structure, or because the holes bored at one side surface of the structure do not communicate with other holes bored at the other side of the structure, the structure is made substantially non-permeable for air or gas, and the structure can be formed thereafter into various required shapes by way of the vacuum forming process.

Figure 3:
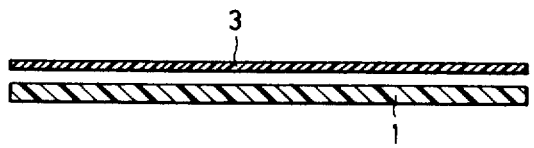
FIGS. 3 through 6 are cross-sectional views also enlarged and showing production steps of the thermo-plastic structure, which constitute another aspect of the present invention.
Figure 4:
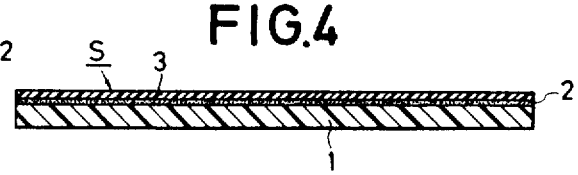

Referring to FIGS. 3 through 6, there are indicated sequential steps employed for the production of a loudspeaker diaphragm utilizing the thermo-plastic laminated structure, which constitutes a second aspect of the present invention. Initially, there are prepared, as shown in FIG. 3 a basic sheet 1 made of, for instance, polystyrene paper and a polyvinyl chloride sheet 3, both arranged to be in an overlying relation one on the other. Then these two sheets 1 and 3 are laminated together as shown in FIG. 4 after the application of adhesive of organic solvent type on either one of the confronting surfaces of the sheets 1 and 3. As described before, when these two sheets are bonded together, there is a tendency of causing seizure of air or gas between the confronting surfaces of the sheets 1 and 3 in which the adhesive is applied. For eliminating this tendency, the construction of the thermo-plastic structure according to the first aspect of the invention is provided with a plenty of minute holes in one or both side surfaces of the structure. However, in what stage of the production process these holes are to be bored is a problem. If the holes are bored before the application of the adhesive, the adhesive subsequently applied would intrude into these holes and clog these holes.

Figure 5:
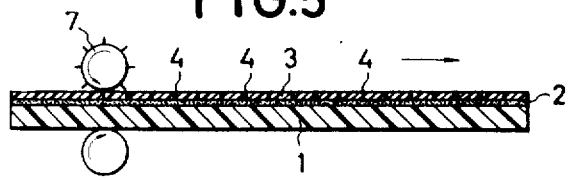
Figure 6:

For this reason, according to the characteristic feature of the second aspect of the invention, the laminated structure is provided with the plurality of holes at a stage a certain time after the adhering step indicated in FIG. 4, by means of, for instance, a needle roller 7 as shown in FIG. 5. By this way, the bonded sheets S which have been shown in FIG. 4 are now provided, as shown in FIG. 5, with the plurality of holes 4, 4, 4, . . . extended along the direction of the thickness of the structure S through the polyvinyl chloride sheet 3 in a mechanical manner until the holes reach the adhesive layer 2 interposed between the two layers 1 and 3. Since the plurality of holes 4, 4, 4, . . . satisfy following limitations:

1. The holes reach the adhesive (bonding agent) layer interposed between the component plastic sheets, whereby one or both sides of the bonding agent layer are communicated with the outside atmosphere in the direction of the thickness of the thermo-plastic structure; and yet, 2. the holes do not penetrate the thermo-plastic structure completely in the direction of the thickness of the structure, whereby both sides of the thermo-plastic structure are not placed under a directly communicated condition, any air or gas or vapor of the solvent of the bonding agent can be delivered into the outside atmosphere through these holes, and lastly the bonded structure S with the bonding agent thus dried out and cured is subjected to the subsequent forming step, such as a vacuum forming step, so that a formed product P as a loudspeaker diaphragm indicated in FIG. 6 is obtained.

Figure 7:
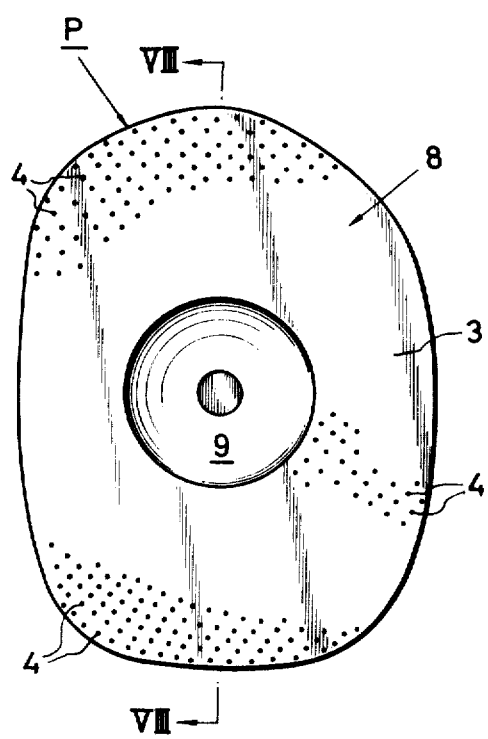
FIG. 7 is a front view showing a vibration plate for a loud-speaker which constitutes one application of the thermo-plastic laminated structure according to this invention.
Figure 8:
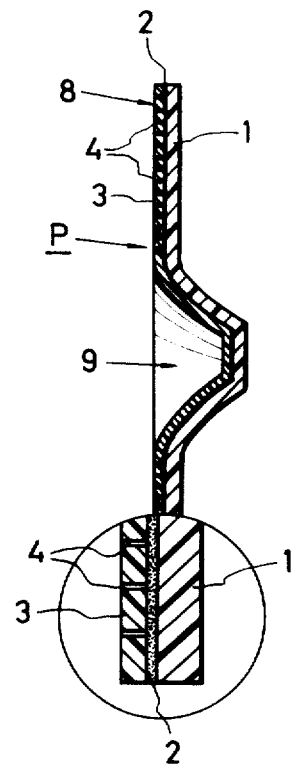
FIG. 8 is a cross-sectional view, in much an enlarged scale, taken along the line VIII — VIII in FIG. 7.

In FIGS. 7 and 8, a loudspeaker which constitutes another preferred example of the present invention is illustrated.

Heretofore, various attempts have been done to produce the diaphragm or vibration plate of a loudspeaker employing a foamed synthetic resin base sheet made of, for instance, polystyrene paper overlaid by a thermo-plastic sheet of, for instance, polyvinyl chloride with the interposition of an adhesive layer of emulsion type polyvinyl acetate family therebetween. However, because of these sheets having scarcely any air or gas permeability, there has existed a tendency of some part of gas or vapor of the solvent (water) of the adhesive staying in the layer between the two sheets or air being seized in the same layer due to careless treatment in the bonding process, whereby swellings or wrinkles may be created on the surface of the resultant laminated structure as described before, and this may effect deleteriously on tone color of the output sound or frequency characteristics of the loudspeaker.

The above described shortcomings of the conventional diaphragm or vibration plate can be eliminated completely by the employment of an improved construction according to the present invention. As shown in FIGS. 7 and 8, the improved construction of the vibration plate of a loud-speaker comprises a foamed synthetic resin base sheet 1 made of, for instance, polystyrene paper and a thermo-plastic sheet 3 made of, for instance, polyvinyl chloride, both sheets being bonded together through the use of adhesive 2 of emulsion type vinyl acetate family.

The manufacturing steps of this embodiment is almost same as above mentioned steps relating to FIGS. 3 to 6, except that this embodiment is so arranged that the last forming step can be carried out before the complete curing of the adhesive layer in the laminated construction, thereby shortening the manufacturing time. Firstly, the base sheet 1 and the thermoplastic sheet 3 are bonded together using adhesive 2 by the same process as shown in FIG. 4. Two sheets 1 and 3 thus bonded together are thereafter subjected to hot-press for initiating curing, and according to a characteristic feature of this invention, the thus treated structure is provided with numerous holes 4, 4, 4, . . . distributed only on the surface of the region which will later become a flat portion 8 surrounding the cone portion 9 of the vibration plate and at positions spaced apart between each other by a desired distance in such a manner that the holes are bored from the upper surface of the polyvinyl chloride sheet 3 until they reach the adhesive layer 2 interposed between the base sheet 1 and the polyvinyl chloride sheet 3. The diameter of the holes 4, 4, 4, . . . may be selected to a suitable value between about 0.1 and 1.0 mm, and the distance between each holes may be selected to about 2 cm.

The central region which will later become the conical portion 4 is left unbored, but the effect of this invention can be substantially accomplished, as the area of this portion is only a fraction of the whole diaphragm area. As this portion is not provided with holes on the sheet 3, the vacuum suction forming can be applied before the complete curing of adhesive layer 2 without causing the parting-off of the two sheets 1 and 3, whereby the manufacturing time is substantially reduced. Otherwise, air would go through the holes into the adhesive layer 2, resulting in that only the base sheet 3 would be subjected to the suction and the thermo-plastic sheet 1 would not closely follow the base sheet 3.

The above described boring step of the numerous holes 4, 4, 4, . . . may also be exercised prior to the hot-press application. However, in such a case, the uncured adhesive may intrude into the holes thus bored and clog these holes, reducing the advantageous feature of these holes substantially.

Of course, the above described holes may be bored alternatively through the base sheet 1 made of polystyrene paper, and in this case, the merit of the holes stays unchanged.

With the above described construction of the vibration plate of a loudspeaker, swellings, wrinkles, and deformation caused in the case of the conventional structures can be completely eliminated, whereby sounds of far beautiful tone-color and of better fidelity in frequency response can be reproduced from the loudspeaker employing the vibration plate.

Although the invention has been described with respect to preferred embodiments thereof, it will be apparent to those skilled in the art that various modifications and alterations may also be carried out without departing the spirit and scope of the present invention, and these are all included in the scope of the present invention as defined hereinbelow.

I claim:

1. A vibration plate for a loudspeaker comprising a laminate structure including a foamed synthetic resin sheet and a thermo-plastic resin sheet bonded thereon by a bonding agent layer interposed therebetween, said laminate structure having a centrally located cone portion and a flat portion surrounding the cone portion, and further including a plurality of minute holes provided only on said flat portion of said laminate structure, and not on said cone portion, said holes spaced apart from each other by a predetermined distance, said holes extending from the upper surface of said thermo-plastic resin sheet to said bonding agent layer.

* * * * *